US010501258B2

(12) United States Patent
Cassoni et al.

(10) Patent No.: US 10,501,258 B2
(45) Date of Patent: *Dec. 10, 2019

(54) AEROSOL DISPENSER HAVING ANNULAR SEALS AND AEROSOL CONTAINER THEREFOR

(71) Applicant: The Procter & Gamble Company, Cincinnati, OH (US)

(72) Inventors: Robert Paul Cassoni, Waynesville, OH (US); Kerry Lloyd Weaver, Florence, KY (US); Robert Earl Magness, Mason, OH (US); Andrew William Franckhauser, Batavia, OH (US); Matthew Aaron Neumann, Montgomery, OH (US); Douglas Bruce Zeik, Liberty Township, OH (US); Scott Edward Smith, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,959

(22) Filed: May 24, 2018

(65) Prior Publication Data

US 2018/0339844 A1    Nov. 29, 2018

Related U.S. Application Data

(63) Continuation of application No. 15/606,857, filed on May 26, 2017.

(51) Int. Cl.
*B65D 83/38* (2006.01)
*B65D 83/62* (2006.01)
(Continued)

(52) U.S. Cl.
CPC .............. *B65D 83/38* (2013.01); *B29B 11/04* (2013.01); *B29C 49/221* (2013.01);
(Continued)

(58) Field of Classification Search
CPC ...... B65D 83/38; B65D 83/62; B65D 83/207; B65D 83/32; B65D 83/384; B65D 1/023; B65D 1/0246
See application file for complete search history.

(56) References Cited

U.S. PATENT DOCUMENTS 2,863,699 A    12/1958    Elser
3,134,518 A    5/1964    Sagarin et al.
(Continued)

FOREIGN PATENT DOCUMENTS

CH    676585 A5    2/1991
EP    0391817 B1    6/1994
(Continued)

OTHER PUBLICATIONS

U.S. Appl. No. 15/606,857, filed May 26, 2017, Cassoni, et al.
(Continued)

*Primary Examiner* — Patrick M. Buechner
(74) *Attorney, Agent, or Firm* — Sarah M DeCristofaro; Abbey A Lopez

(57) ABSTRACT

An aerosol container suitable for use as an aerosol dispenser. The aerosol container includes at least a valve and product delivery device joined to an outer container. The valve and product delivery device have respective annular welds or other seals joining the valve and product delivery to the outer container. The welds, or other seals may be concentric, with one circumscribing the other, in the same plane or different planes. Suitable product delivery devices include bags and dip tubes.

14 Claims, 15 Drawing Sheets
(4 of 15 Drawing Sheet(s) Filed in Color)

(51) Int. Cl.
*B65D 83/48* (2006.01)
*B29C 65/06* (2006.01)
*B29B 11/04* (2006.01)
*B29C 65/78* (2006.01)
*B29C 65/82* (2006.01)
*B29C 65/00* (2006.01)
*B29C 49/22* (2006.01)
*B65D 83/20* (2006.01)
*B29L 31/00* (2006.01)
*B29L 9/00* (2006.01)

(52) U.S. Cl.
CPC ........ *B29C 65/069* (2013.01); *B29C 65/0672* (2013.01); *B29C 65/7844* (2013.01); *B29C 65/8253* (2013.01); *B29C 66/1312* (2013.01); *B29C 66/30223* (2013.01); *B29C 66/322* (2013.01); *B29C 66/5344* (2013.01); *B29C 66/542* (2013.01); *B29C 66/543* (2013.01); *B29C 66/545* (2013.01); *B29C 66/612* (2013.01); *B29C 66/73921* (2013.01); *B29C 66/843* (2013.01); *B65D 83/48* (2013.01); *B65D 83/62* (2013.01); *B29B 2911/1402* (2013.01); *B29B 2911/143* (2013.01); *B29B 2911/1408* (2013.01); *B29B 2911/1466* (2013.01); *B29B 2911/14066* (2013.01); *B29B 2911/14093* (2013.01); *B29B 2911/14328* (2015.05); *B29B 2911/14335* (2015.05); *B29B 2911/14341* (2015.05); *B29B 2911/14413* (2013.01); *B29B 2911/14573* (2013.01); *B29B 2911/14666* (2013.01); *B29C 66/232* (2013.01); *B29C 66/71* (2013.01); *B29C 66/723* (2013.01); *B29C 66/7234* (2013.01); *B29L 2009/001* (2013.01); *B29L 2031/7156* (2013.01); *B65D 83/205* (2013.01)

(56) References Cited

U.S. PATENT DOCUMENTS

| | | | | |
|---|---|---|---|---|
| 3,161,330 A * | 12/1964 | Sagarin | ............... | B65D 83/205 222/402.2 |
| 3,245,582 A * | 4/1966 | Roth | ............... | B65D 83/62 222/386.5 |
| 3,257,036 A * | 6/1966 | Micallef | ............... | B65D 83/62 222/464.2 |
| 3,333,743 A | 8/1967 | Meyers | | |
| 3,403,804 A | 10/1968 | Colombo | | |
| 3,450,254 A | 6/1969 | Miles | | |
| 3,592,361 A * | 7/1971 | Marand | ............... | B65D 83/60 222/136 |
| 3,598,292 A | 8/1971 | Kiliany | | |
| 3,669,316 A | 6/1972 | Corsette | | |
| RE30,093 E | 9/1979 | Burger | | |
| 4,330,066 A | 5/1982 | Berliner | | |
| 4,640,442 A * | 2/1987 | Drobish | ............. | B65D 83/0033 222/209 |
| 4,756,347 A | 7/1988 | Hagan | | |
| 4,969,577 A | 11/1990 | Werding | | |
| 5,078,987 A * | 1/1992 | Nakamura | ............. | A01N 25/02 424/43 |
| 5,219,005 A | 6/1993 | Stoffel | | |
| 5,346,659 A * | 9/1994 | Buhler | ................... | B29C 45/38 264/154 |
| 5,553,753 A * | 9/1996 | Abplanalp | ............. | B65D 11/02 220/4.05 |
| 5,573,043 A | 11/1996 | Fuehrer | | |
| 5,709,318 A * | 1/1998 | Oder | ................... | B65D 47/2006 222/153.06 |
| 6,019,252 A | 2/2000 | Benecke et al. | | |
| 6,254,820 B1 | 7/2001 | Cornell | | |
| 6,375,045 B1 | 4/2002 | Ki | | |
| 7,028,866 B2 | 4/2006 | Kunesh et al. | | |
| 7,279,207 B2 | 10/2007 | Darr | | |
| 7,303,087 B2 | 12/2007 | Flashinski et al. | | |
| 8,074,847 B2 | 12/2011 | Smith | | |
| 8,096,327 B2 | 1/2012 | Hirz | | |
| 8,439,223 B2 | 5/2013 | Smith et al. | | |
| 8,505,762 B2 | 8/2013 | Holbach et al. | | |
| 8,511,522 B2 | 8/2013 | Chan et al. | | |
| 8,631,632 B2 | 1/2014 | Morales et al. | | |
| 8,752,731 B2 | 6/2014 | Nimmo et al. | | |
| 8,844,765 B2 | 9/2014 | Tryon | | |
| 8,869,842 B2 | 10/2014 | Smith | | |
| 9,061,795 B2 | 6/2015 | Girardot et al. | | |
| 9,132,955 B2 | 9/2015 | Smith et al. | | |
| 9,174,229 B2 | 11/2015 | Smith | | |
| 9,296,550 B2 | 3/2016 | Smith et al. | | |
| 9,334,103 B2 | 5/2016 | Soliman | | |
| 9,505,509 B2 | 11/2016 | Smith | | |
| 9,573,750 B2* | 2/2017 | Seling | ................... | B65D 83/48 |
| 2002/0027146 A1 | 3/2002 | de LaForcade et al. | | |
| 2009/0014679 A1* | 1/2009 | Hygema | ................ | B65D 83/38 251/368 |
| 2011/0101036 A1 | 5/2011 | Wanbaugh et al. | | |
| 2011/0248035 A1 | 10/2011 | Peirsman et al. | | |
| 2012/0288465 A1* | 11/2012 | Loechel | ................ | A61K 8/046 424/70.28 |
| 2012/0291911 A1 | 11/2012 | Smith | | |
| 2012/0292338 A1 | 11/2012 | Smith | | |
| 2013/0161349 A1* | 6/2013 | Pfeiffenberger | ........ | B32B 15/20 222/95 |
| 2015/0033675 A1 | 2/2015 | Smith | | |
| 2015/0108387 A1* | 4/2015 | Smith | .................... | B65D 83/48 251/333 |
| 2016/0101925 A1* | 4/2016 | Franz | .................... | B65D 83/48 222/402.25 |
| 2016/0368700 A1 | 12/2016 | Smith et al. | | |
| 2016/0377231 A1* | 12/2016 | Smith | ....................... | F16K 1/30 251/325 |
| 2017/0050767 A1 | 2/2017 | Compo et al. | | |
| 2018/0333920 A1 | 11/2018 | Cassoni | | |
| 2018/0334276 A1 | 11/2018 | Cassoni | | |
| 2018/0339841 A1 | 11/2018 | Magness | | |
| 2018/0339843 A1 | 11/2018 | Cassoni | | |
| 2018/0339844 A1 | 11/2018 | Cassoni | | |

FOREIGN PATENT DOCUMENTS

| | | |
|---|---|---|
| FR | 2907768 B1 | 12/2008 |
| GB | 906359 A | 9/1962 |
| WO | WO9108099 A1 | 6/1991 |

OTHER PUBLICATIONS

U.S. Appl. No. 15/987,968, filed May 24, 2018, Cassoni, et al.
Search report; PCT/US2018/034364; 17 Pages dated Aug. 28, 2018.
Search report; PCT/US2018/032863; 16 Pages dated Aug. 27, 2018.
Search report; PCT/US2018/034049; 19 Pages dated Aug. 28, 2018.
All Office Actions, U.S. Appl. No. 15/606,894.

\* cited by examiner

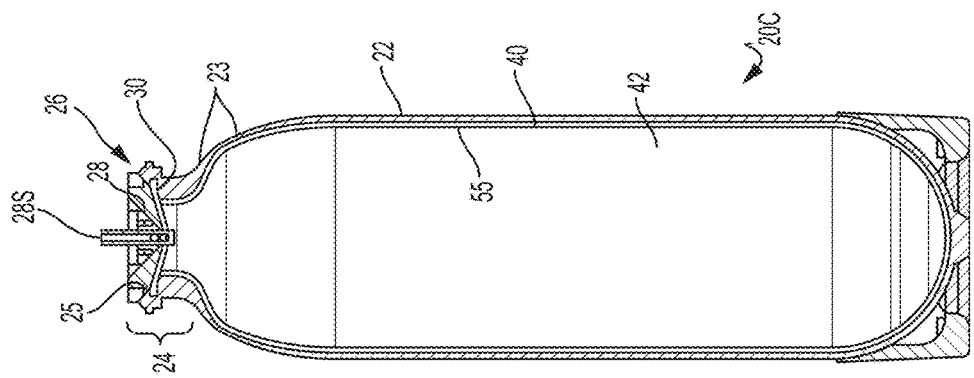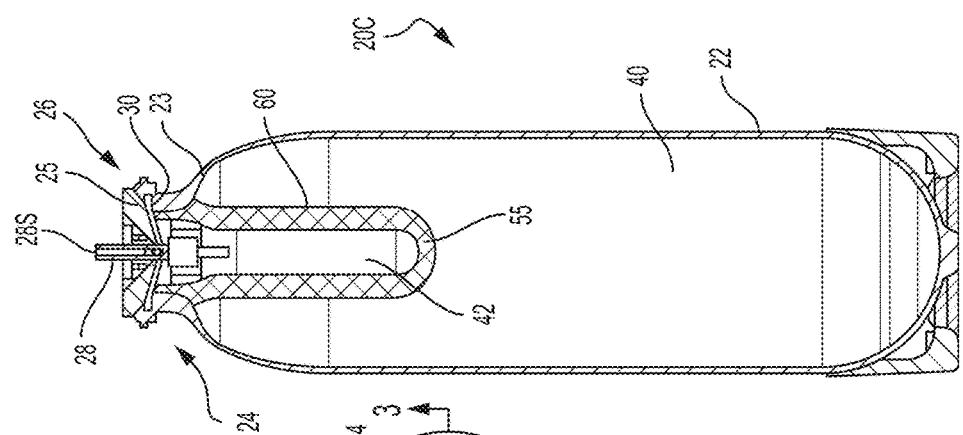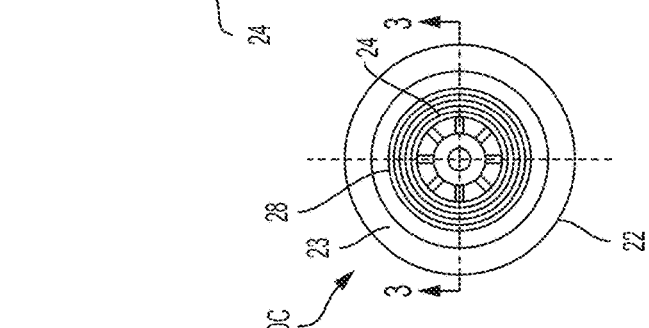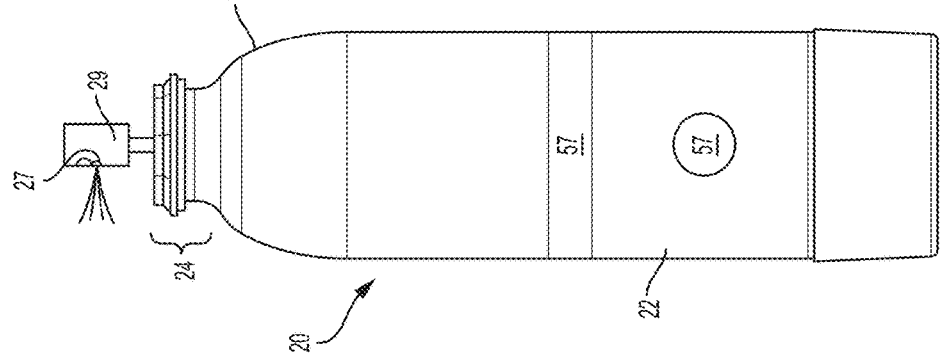

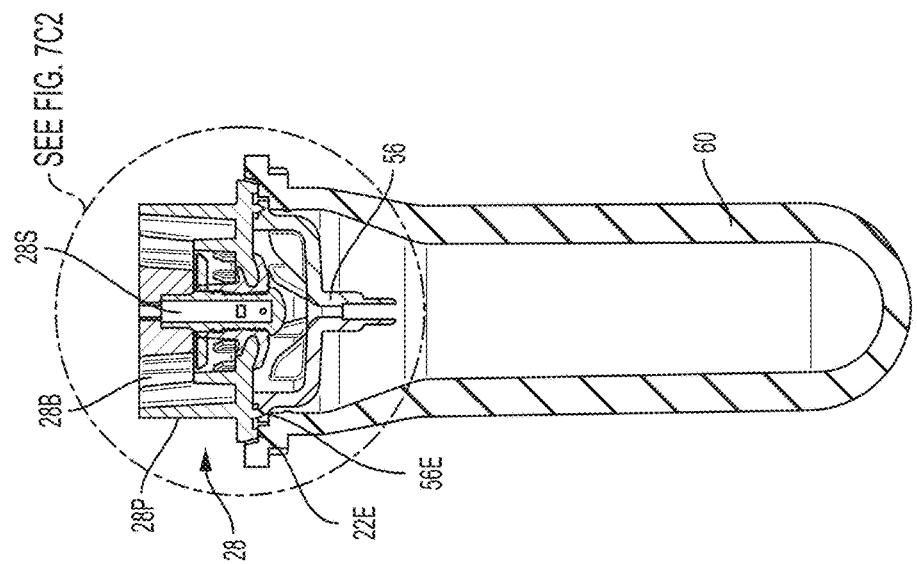
FIG. 7C1
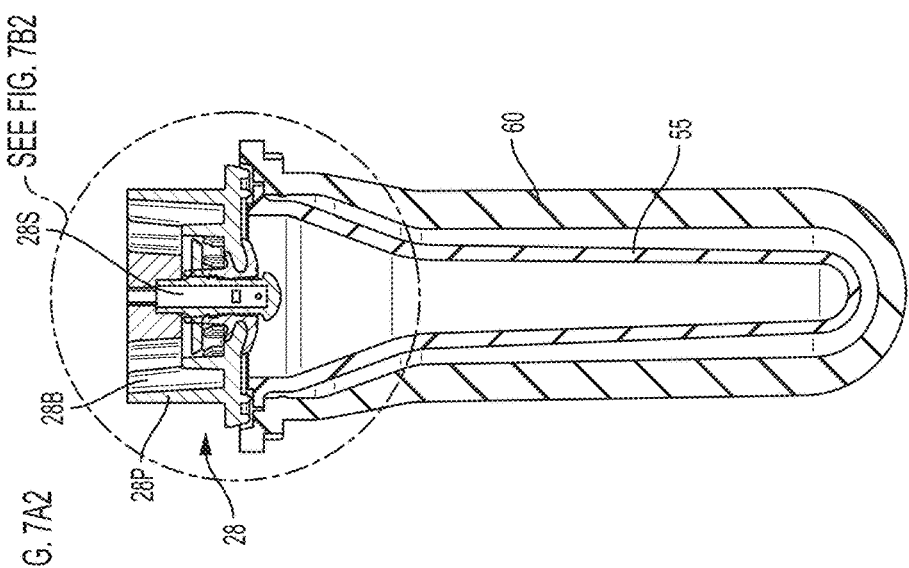
FIG. 7B1
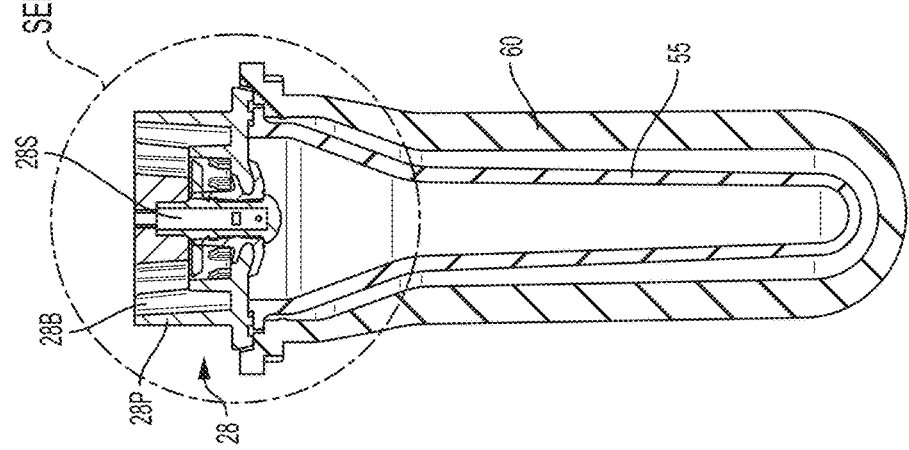
FIG. 7A1

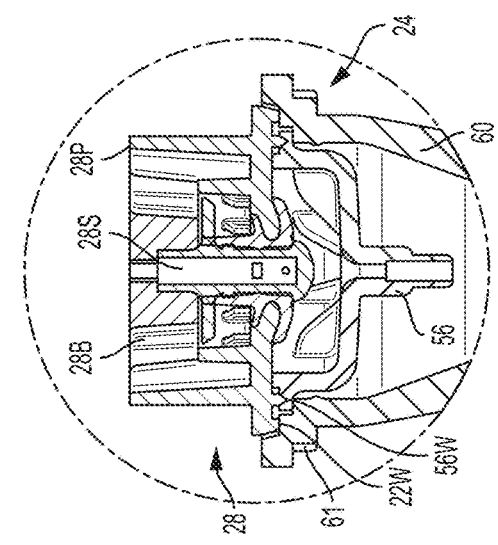
FIG. 7C2
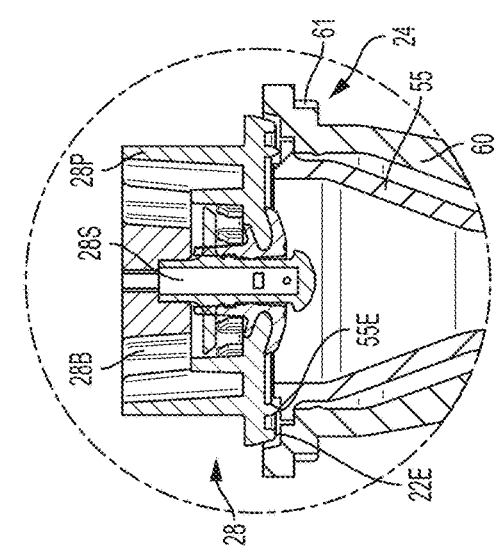
FIG. 7B2
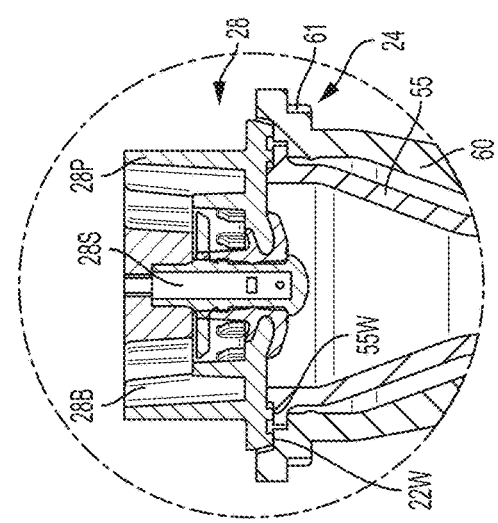
FIG. 7A2

AEROSOL DISPENSER HAVING ANNULAR SEALS AND AEROSOL CONTAINER THEREFOR

FIELD OF THE INVENTION

The present invention relates to permanently sealed plastic aerosol dispensers and aerosol containers for the manufacture thereof.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 4,969,577; 8,752,731; 9,296,550; 9,334,103 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or a base cup as shown in commonly assigned U.S. Pat. Nos. 8,439,223 and 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765; 8,869,842 and 9,505,509. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, and may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve 28 and plastic valve cup are used. Suitable interlocks include bayonet fittings and threads as disclosed in commonly assigned P&G Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned P&G Case 14458, Ser. No. 15/235,227, filed Aug. 12, 2016 which teaches attaching a bag to a valve cup.

If a bag configuration is desired, propellant may be disposed between the bag and outer container, as disclosed in U.S. Pat. No. 5,219,005 and in commonly assigned U.S. Pat. Nos. 8,631,632 and 8,869,842. Afterwards, product fill may occur in a separate, remote, operation, optionally carried out in another location, which may be in the same country or in a different country commonly assigned 2012/0291911. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned P&G Case 14461, application Ser. No. 15/235,279, filed Aug. 12, 2016.

Alternatively, a dip tube may be used if intermixing of the product and propellant is desired. When the user actuates the valve, the product and propellant are dispensed together through the dip tube. This embodiment may utilize a dip tube. The dip tube takes the product and propellant mixture from the bottom of the outer container. Or a piston may be used to expel product, particularly if highly viscous, as described in 2002/0027146, U.S. Pat. No. 6,375,045 and commonly assigned 2016/0368700.

Collectively, bags, dip tube, pistons and the associated hardware are referred to as product delivery devices. Various formats for the delivery devices may be required for different products, often complicating production. For example, one product may require a dip tube product delivery device in conjunction with a very small nozzle. The next aerosol dispenser on the production schedule may simply require changeout to a new, larger, nozzle.

But if one wishes to then manufacture an aerosol dispenser utilizing a bag for a particular production cycle, then manufacture an aerosol dispenser having a dip tube, for subsequent production cycles, considerable changeout is required. Different outer containers are typically needed to accommodate the different product delivery devices. Likewise, different valves are likely required. As different valves are required, the different outer containers must be matched to accommodate the different valves. Different valves may also require different valve cups which can be plastic and sealed into place, preferably welded into place, be metal and crimped into place or no valve cup at all may be needed. A combination of outer container, valve, product delivery device and associated hardware, if any, is referred to as a format for a particular aerosol dispenser.

The numbers of components required for even a few different formats can dramatically increase as different products are produced in respective aerosol dispensers. Such increase dramatically raises production costs and increases the opportunity for mistakes. Accordingly this invention is directed to the problem of simplifying production of aerosol dispensers when plural aerosol dispenser formats are sought, particularly by using plural seals, preferably plural welds.

SUMMARY OF THE INVENTION

In one embodiment the invention comprises an aerosol dispenser, in another embodiment aerosol container for an aerosol dispenser. Each embodiment has an aerosol container having a longitudinal axis and comprising an outer container comprising a closed end bottom and an open neck longitudinally opposed thereto. The open neck has a valve sealed to the outer container in fluid tight relationship by an outer container seal. A product delivery device is sealed to the valve in fluid tight relationship by a product delivery device seal. The product delivery device seal is radially spaced apart from the outer container seal.

BRIEF DESCRIPTION OF THE DRAWINGS

The patent or application file contains at least one photograph executed in color. Copies of this patent or patent application publication with color photograph(s) will be provided by the Office upon request and payment of the necessary fee.

The drawings are to scale, unless otherwise noted as schematic.

FIG. 1 is a side elevational view of an aerosol dispenser according to the present invention, showing an actuator and spray being schematically dispensed from a nozzle, the actuator and nozzle being omitted from all subsequent figures.

FIG. 2 is a top plan view of an aerosol container suitable for use with the aerosol dispenser of FIG. 1.

FIG. 3A is a vertical sectional view taken along line 3-3 of FIG. 2 and showing the inner bag in its state as a preform.

FIG. 3B is a vertical sectional view taken along line 3-3 of FIG. 2 and showing the inner bag in its blow molded state as a bag.

FIG. 7A1 is a vertical sectional view of the preform and valve of FIG. 6A having a bag for the product delivery device welded to the preform and showing the valve in the closed position.

FIG. 7A2 is an enlarged fragmentary view of the valve and preform of FIG. 7A1.

FIG. 7B1 is a vertical sectional view of the preform and valve of FIG. 7A1 prior to welding with the protrusions in position, the bag protrusion depending lower than the outer container protrusion and showing the valve in the open position.

FIG. 7B2 is an enlarged fragmentary view of the valve and preform of FIG. 7B1.

FIG. 7C1 is a vertical sectional view of an alternative embodiment of the preform and valve of FIG. 6A having a dip tube for the product delivery device with the protrusions in position, the dip tube concentrator depending lower than the outer container protrusion.

FIG. 7C2 is an enlarged fragmentary view of the valve and preform of FIG. 7C1, showing the valve and dip tube welded into position.

DETAILED DESCRIPTION OF THE INVENTION

Figure 6A:
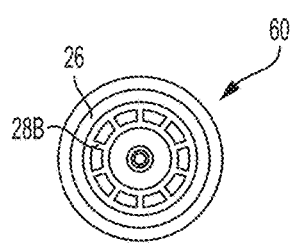
FIG. 6A is a top plan view of a preform suitable for use with the present invention and having a valve thereon.

Referring to FIGS. 1 and 2, an aerosol dispenser 20 having a longitudinal axis is shown. The aerosol dispenser 20 comprises a pressurizeable outer container 22 usable for such an aerosol dispenser 20. The outer container 22 has a neck 24 into which a valve cup 26, as illustrated in FIG. 6A, is sealingly disposed. A valve 28 and actuator 29 may be disposed in the valve cup 26 for selective dispensing of product 42 from the aerosol dispenser 20. A seal 30, as illustrated in FIGS. 3A and 3B, having a surface for sealing a valve 28 to the valve cup 26 may be disposed below the valve cup 26 and valve 28 to prevent escape of product 42 to ambient. As used herein, an aerosol container 20C may be a subset of an aerosol dispenser 20, and have an outer container 22, valve cup 26 sealed thereto with a bag 55, as illustrated in FIG. 3B, or dip tube 56, as illustrated in FIG. 7C1, collectively referred to as a product delivery device 55, 56, joined to the valve cup 26, and optionally propellant 40, but not necessarily a valve 28, actuator 29, labeling 57, etc. Optionally the valve 28 may be directly joined to the outer container without a separate valve cup 26.

As used herein, the top of the aerosol dispenser 20 or the container 22 is taken as the uppermost part, when the aerosol dispenser 20 or container 22 is vertically oriented in its normal use or storage position. As used herein, the bottom of the aerosol dispenser 20 or the container 22 is taken as the lowermost part, when the aerosol dispenser 20 or the container 22 is vertically oriented in its normal use or storage position. The top and bottom are longitudinally opposed, with the top typically being open and bottom typically being a closed end. The terms 'above' and 'below' refer to relative positions towards and away from the top, respectively. Likewise the terms 'above' and 'below' refer to relative positions away from and towards the bottom, respectively.

The aerosol dispenser 20 and outer container 22 have a longitudinal axis, defining the main axis. The aerosol dispenser 20 and outer container 22 may be longitudinally elongate, i.e. having an aspect ratio of longitudinal dimension to transverse dimension[s] such as diameter greater than 1, an aspect ratio equal to 1 as in a sphere or shorter cylinder, or an aspect ratio less than 1.

The outer container 22 may comprise metal or preferably plastic, as are known in the art. The plastic may be polymeric, and particularly comprise polyethylene terephthalate (PET) or polypropylene (PP) for all of the components described herein. The outer container 22 may be injection molded or further blow molded in an ISBM process, as well known in the art. The outer container 22 defines a longitudinal axis and may have an opening at one end thereof. The opening is typically at the top of the pressurizeable container when the pressurizeable container is in its-in use position. The opening defines a neck 24, to which other components may be sealingly joined.

As the top of the outer container 22 is approached, the outer container 22 may have a neck 24. The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

A normally closed valve 28 may be disposed in the neck 24. The valve 28 is openable upon demand by a user, in response to manual operation of an actuator 29. The actuator 29 may be depressable, operable as a trigger, etc. to spray product 42 from the aerosol dispenser 20. Illustrative and non-limiting products 42 include shave cream, shave foam, body sprays, body washes, perfumes, cleansers, air treatments, astringents, foods, paint, insecticides, etc.

Referring to FIGS. 3A-3B, an optional valve cup 26 may be sealed to the opening of the outer container 22. The valve cup 26 may be sealed to the neck 24 of the outer container 22 using class 1 TPE material. Polyester based TPE sold by Kraiburg TPE GmbH & Co KG of Waldkraiburg, Germany under the name HTC8791-52 and sold by DuPont of Delaware under the name HYTEL may be used for good resistance to Silicone and adhesion to PET. Such a TPE material is believed to fall under Resin Identification Code 1/01 for PETE/PET, as set forth above by the Society of Plastics Industry and ASTM D7611. Or a Styrenic bloc copolymer based TPE such as Kraiburg HTC8791-24 or Krayton elastomer may be used, providing easier process and lower density. Other seal materials include silicone, rubber and similar conformable materials.

If desired, the valve cup 26 may be sealed to the outer container 22 utilizing a press fit, interference fit, solvent welding, laser welding, sonic welding, ultrasonic welding, spin welding, adhesive or any combination thereof. An intermediate component, such as a sleeve or connector may optionally be disposed intermediate the valve cup 26 and neck 24 or top of the outer container 22. Any such arrangement is suitable, so long as a seal adequate to maintain the pressure results.

Referring particularly to FIG. 3A, a preform 60 can be made in a single injection molding operation, providing tolerances suitable for mass production. A first preform 60 is then blow molded in known fashion to make the outer container 22. A valve attachment 25, such as threads, is above the blow molding operation, preventing undue dimensional distortion thereof. A second preform 60 can be used to make the valve cup 26 as the finish and internal bag 55 as the body upon blow molding thereof. One of skill will understand the blow molding step may also include stretching as is known in the art.

Referring particularly to FIG. 3B, the bag 55 can be integral with the valve cup 26. By integral it is meant that the bag 55 and valve cup 26 are monolithic, molded at the same time or molded of two different materials melted together in a permanent manner An integral bag 55 and valve cup 26 cannot be separated into two components without tearing or undue deformation. A container 22 made from a preform 60 using ISBM is referred to herein as a molded container 22.

Figure 4A:
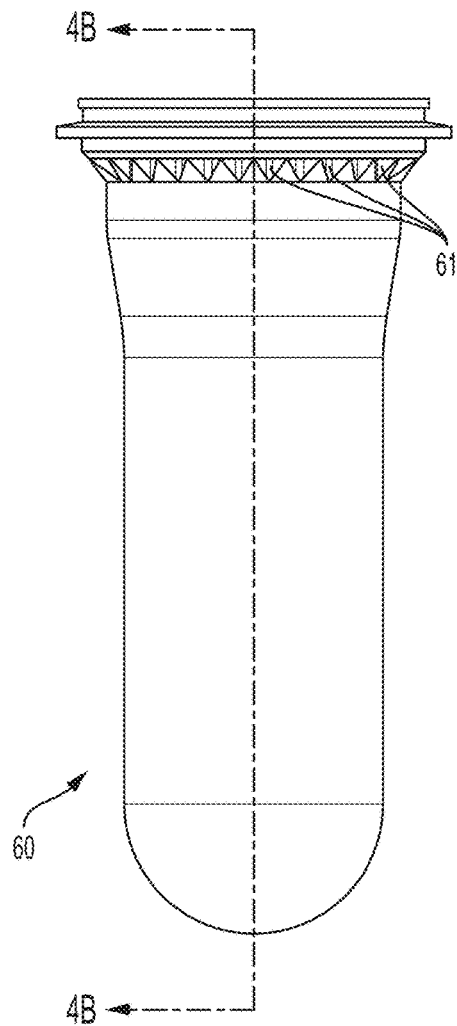
FIG. 4A is a side elevational view of a preform suitable for use with the present invention.
Figure 4B:
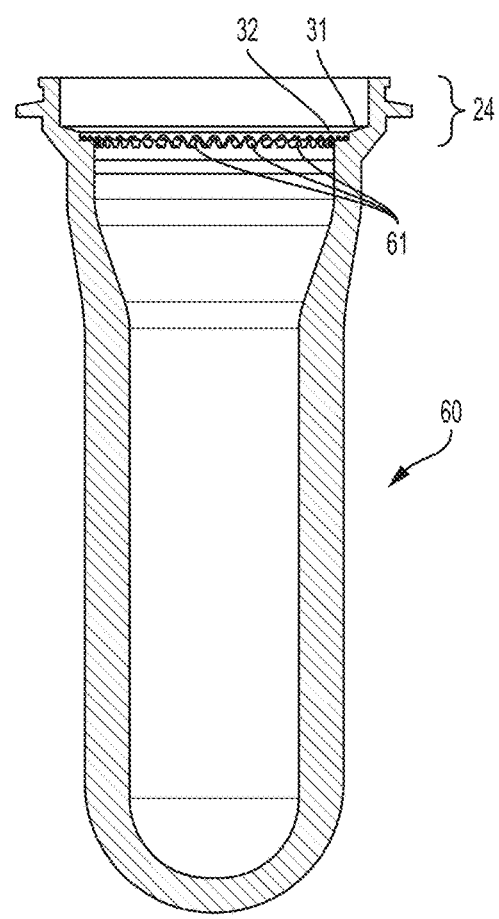
FIG. 4B is a vertical sectional view taken along lines 4B-4B of FIG. 4A.
Figure 4C:
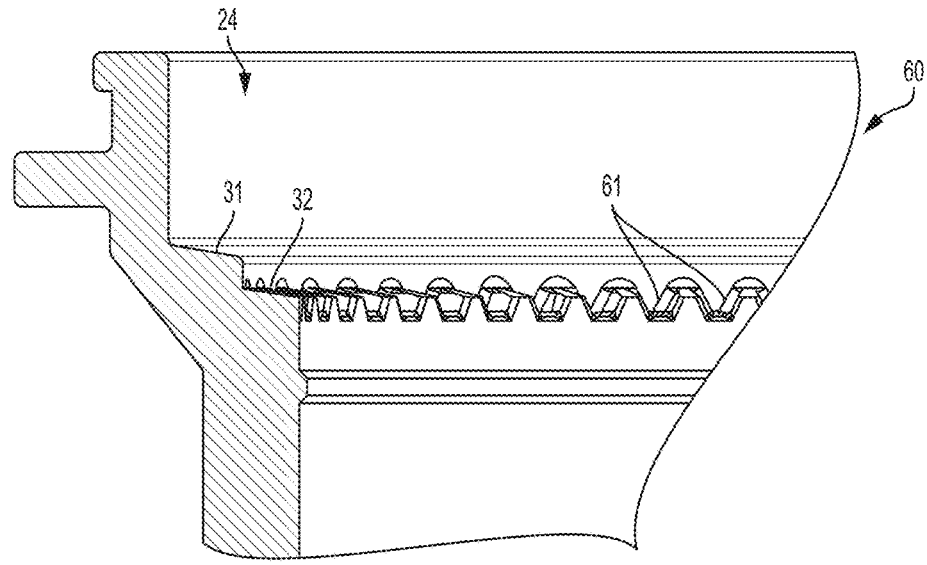
FIG. 4C is a fragmentary enlarged view of the preform of FIG. 4B.

Referring to FIGS. 4A, 4B and 4C, the preform 60 may be used to make the outer container 22 or a bag 55 for use with the aerosol dispenser 20 of this invention. One of skill will recognize a bag 55 is commonly used to contain product 42 and keep such product 42 isolated from the propellant 40.

Figure 5A:
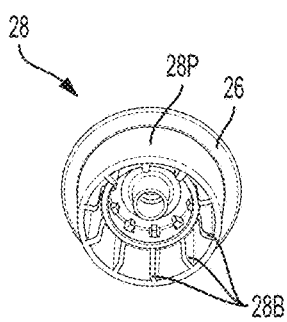
FIG. 5A is a top perspective view of a valve usable with the present invention.
Figure 5B:
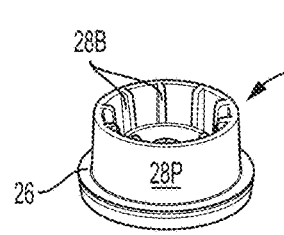
FIG. 5B is a side perspective view of the valve of FIG. 5A.
Figure 5C:
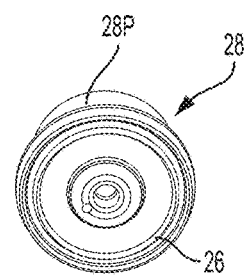
FIG. 5C is a bottom perspective view of the valve of FIG. 5A

Referring to FIGS. 5A, 5B and 5C, a valve 28, in turn, may be disposed within the valve cup 26. The valve 28 provides for retention of product 42 within the aerosol dispenser 20 until the product 42 is selectively dispensed by a user. The valve 28 may be selectively actuated by an actuator 29. A nozzle 27 and related valve 28 components may optionally be included, depending upon the desired dispensing and spray characteristics. The valve 28 may be attached using conventional and known means. The valve 28 and actuator 29 may be conventional and do not form part of the claimed invention. Selective actuation of the valve 28 allows the user to dispense a desired quantity of the product 42 on demand The valve 28 may provide for dispensing from the top of the bag 55/dip tube 56 through one or more ports and into the valve stem. Optionally, the valve 28 may have a bypass outside the ports to accommodate relatively viscous product 42.

A valve stem 28S provides a product 42 flow path and joins the actuator 29 to the valve 28 in fluid communication. The valve 28 may have an upwardly projecting sheath 28P. The upstanding sheath 28P may circumscribe and extend longitudinally beyond the valve stem 28S. Alternatively the upstanding sheath 28P may comprise three or more circumferentially spaced upstanding struts, each of which longitudinally extend beyond the valve stem 28S. Either geometry protects the valve stem 28S during storage and assembly.

For example, if the aerosol containers 20C are solder stacked prior to product 42 fill and adding the actuator 29, the sheath 28P protects the valve stem 28S from layers stacked on top.

Furthermore, the sheath 28P may have internal or external blades 28B. The blades 28B may assist in theadedly assembling the valve 28 to the outer container 22, or in spin welding the valve 28 to the outer container 22.

Alternatively or additionally, the sheath 28P may be cantilevered from the top of the outer container 22. In such an embodiment, the sheath 28P may be joined to the outer container 22 after blow molding. Alternatively, and preferably, the sheath 28P may be integrally molded with the preform 60. This arrangement eliminates an assembly step and the possibly detachment.

Figure 6B:
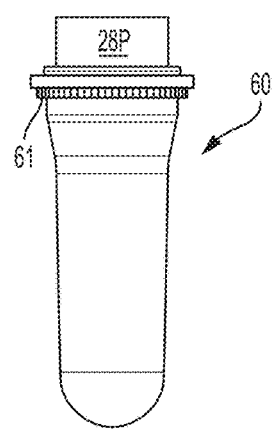
FIG. 6B is a side elevational view of the valve and preform of FIG. 6A.
Figure 6C:
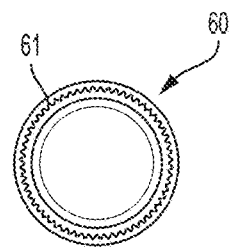
FIG. 6C is a bottom plan view of the valve and preform of FIG. 6A.

Referring to FIGS. 6A, 6B and 6C, the valve may be inserted on a preform 60. The preform 60 is blown into an outer container 22. The preform 60 may be blown into the outer container 22 before or after the valve 28 is attached.

Referring to FIGS. 7A1, 7A2, 7B1, 7B2, 7C1 and 7C2, the product delivery device 55, 56 may be used to contain and/or provide for delivery of product 42 from the aerosol dispenser 20 upon demand Suitable product delivery devices 55, 56 comprise pistons, bags 55, dip tubes 56, and do not form part of the claimed invention, except as specifically claimed herein. If desired, the product delivery device 55, 56 may further comprise a metering device for dispensing pre-determined, metered quantities of product 42, as described in U.S. Pat. Nos. 2,815,889; 4,142,652 and 5,421,492. The product delivery device 55, 56 may also comprise an inverting valve having a ball therein to alter product 42 flowpath.

If desired the product delivery device 55, 56 may comprise a dip tube 56 disposed in a bag 55. Such a dip tube 56 may reach to nearly the bottom of the bag 55, or be juxtaposed near the middle of the bag 55. A dip tube may be made according to U.S. Pat. No. 8,091,741.

The pressurizeable container may further include a propellant 40. The propellant 40 may comprise hydrocarbons, nitrogen, air and mixtures thereof. Propellant 40 listed in the US Federal Register 49 CFR 1.73.115, Class 2, Division 2.2 are also considered acceptable. The propellant 40 may particularly comprise a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or SOLSTICE.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

If desired, the outer container 22, valve cup 26, valve 28, and/or piston may be polymeric. By polymeric it is meant that the component is formed of a material which is plastic, comprises polymers, and/or particularly polyolefin, polyester or nylons, and more particularly PET. Thus, the entire aerosol dispenser 20 or, specific components thereof, may be free of metal, allowing microwaving. Microwave heating of the aerosol dispenser 20 or pressurizable container therefor provides for heating of the product 42 prior to dispensing. Heating of the product 42 prior to dispensing may be desirable if the product 42 is applied to the skin, becomes more efficacious at lower viscosities, or is to be eaten.

The valve cup 26 may have a valve cup 26 periphery complementary to the neck 24 periphery. At least one of the valve cup 26 and/or container neck 24 may have one or more channels therethrough. Additionally or alternatively, the channels may be formed at the interface between the valve cup 26 and container neck 24. The channels may be formed by irregularities, such as crenulations, merlins, serrations, notches, teeth, etc. between valve cup 26 and/or container neck 24.

The outer container 22, and all other components, optionally excepting the TPE seal, may comprise, consist essentially of or consist of PET, PEN, Nylon, EVOH or blends thereof to meet DOT SP 14223. All such materials may be selected from a single class of recyclable materials, as set forth above by the Society of Plastics Industry and ASTM D7611. Particularly all components of the aerosol dispenser 20 may comprise the aforementioned TPE and PET/PETE, Resin Identification Code 1/01. This material selection provides the benefit that the entire aerosol dispenser may advantageously be recycled in a single stream.

Alternatively, the valve cup 26 and/or bag 55 may comprise plural layers such as nylon with EVOH, PET and/or polyolefin materials. Three layers may be utilized, such as PET/Nylon/PET or PET/EVOH/PET. The layers may be co-molded or overmolded. The multi-layer arrangements may provide increased barrier resistance and reduced failure rates.

Referring back to FIG. 1, the outer container 22, and/or optionally the product delivery device 55, 56, may be transparent or substantially transparent. This arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear.

Suitable decoration includes labels 57. Labels 57 may be shrink wrapped, printed, etc., as are known in the art. Any label 57 which provides useful and or aesthetic indicum for the user is acceptable and contemplated herein.

The outer container 22 may define a longitudinal axis of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device 55, 56. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The outer container 22 may sit on a base. The base is disposed on the bottom of the outer container 22. Suitable bases include petaloid bases, champagne bases, hemispherical or other convex bases used in conjunction with a base cup. Or the outer container 22 may have a generally flat base with an optional punt.

A manifold may supply propellant 40, under pressure, through at least one channel between the valve cup 26 and container neck 24. The manifold may be retractingly disposed above the container 22. The manifold may be brought into contact with the valve cup 26, forming a temporary seal therebetween. Suitable channels are particularly described in commonly assigned U.S. Pat. No. 8,869,842 to Smith at FIG. 8, column 7, lines 57 to column 8, line 2 and column 8, lines 44-60. While the temporary seal is established between the manifold and valve cup 26, the propellant 40 may be charged into the outer container 22.

The aerosol dispenser 20, as presented to a user may have an initial pressure. The initial pressure is the highest pressure encountered for a particular filling operation, and corresponds to no product 42 yet being dispensed from the product delivery device 55, 56. As product 42 is depleted, the outer container 22 approaches a final pressure. The final pressure corresponds to depletion of substantially all product 42, except for small residual, from the product delivery device 55, 56. One benefit of the invention is that the residual product 42, remaining at end of life, is unexpectedly minimized This arrangement provides the benefit that propellant 40 may be charged to a lesser pressure than the desired starting pressure, decreasing propellant 40 charge time and reducing pressure applied to the charging machinery. Another benefit is that propellant 40 is disposed as needed for the end use when the aerosol dispenser 20 is ready for sale, product 42 fill and upon product 42 depletion may be recharged with product 42 and reused.

At 21 degrees C., the outer container 22 may be pressurized to an internal gage pressure of 100 to 1300, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, and any values therebetween.

If a permanent seal between components of the aerosol dispenser 20 is desired, the seal may be welded. Particularly, if the components have compatible melt indices, such components may be sealed by welding to retain propellant therein. Welding may occur in either or both of the liquid and glassy phases, and may be optionally be assisted by application of compressive forces. Suitable welding processes may include sonic, ultrasonic, spin, and laser welding. Welding may be accomplished with a commercially available welder, such as available from Branson Ultrasonics Corp. of Danbury, Conn. Alternatively or additionally, the channel may prophetically be blocked by a plug or sealed by adhesive bonding. Suitable sealing processes are particularly described in commonly assigned U.S. Pat. No. 8,869, 842 to Smith at FIG. 9 and column 8, lines 30-43.

Spin welding has been found to be particularly preferred. Spin welding provides the benefit that the energy plane is generally confined to a small vertical space, limiting unintended damage of other components not intended to be welded or receive such energy. Spin welding further provides the benefit that both the outer container weld 22W and the weld 55W for the bag 55/the weld 56W for the dip tube 56 may occur simultaneously or nearly at the same time, increasing product speed.

Or if desired, the product delivery device weld 55W, 56W may occur first, providing a pressure boundary between the product delivery device 55, 56 and the valve 28. During establishment of or once the pressure boundary has been established, the propellant 40 charge may occur, allowing for simultaneous welding and charging. After the product delivery device weld 55W, 56W and propellant 40 charge occur the outer container weld 22W may be completed, providing for containment of the propellant 40 within the outer container 22.

The timing of the product delivery device weld 55W, 56W occurring after, or preferably before the outer container weld 22W may be influenced by respective protrusions 22E, 55E, 56E. Particularly the valve 28 may have a depending product delivery device protrusion 55E, 56E, circumscribing an outer container protrusion 22E. The if the protrusions equally contact the respective mating surfaces, the product delivery device weld 55W, 56W, and outer container weld 22W will generally simultaneously occur. Preferably, the product delivery device protrusion 55E for the bag 55/56E for the dip tube 56 depends further than the outer container protrusion 22E, so that welding order allows for propellant charge 40 as described herein.

If the product delivery device 55, 56 is a dip tube 56, the propellant 40 charge and product 42 charge may simultaneously occur. The propellant 40 and product 42 may be premixed into a single charge, which occurs during the welding operation. Alternatively either a bag 55 or a dip tube 56 aerosol dispenser 20 may have the product 42 later added through the valve 28, as is known in the art.

A first annular sealing surface 31 is disposed below the valve 28 and has a first sealing surface diameter FSD which is less than the valve attachment diameter, VAD. A second annular sealing surface 32 is disposed below the first annular sealing surface 31 and has a second sealing surface diameter SSD less than the first sealing surface diameter FSD. The first annular sealing surface 31 may provide support for the valve 28, which may be disposed between the first annular sealing surface 31 and the valve 28. The second annular sealing surface 32 may provide support for the product delivery device 55, 56, which may be disposed between the second annular sealing surface 32 and the valve 28.

The first annular sealing surface 31 may circumscribe the second annular sealing surface 32. The first annular sealing surface 31 may be in the same plane as the second annular sealing surface 32, or may be in a different plane, particularly first annular sealing surface 31 may be above the second annular sealing surface 32. The first annular sealing surface 31 is disposed radially outward of the second annular sealing surface 32.

The valve 28 is welded to the outer container 22 in fluid tight relationship by an outer container weld 22W. The outer container weld 22W occurs between the valve 28 and the first annular sealing surface 31. Likewise, a product delivery device 55, 56 is welded to the outer container 22 in fluid tight relationship by a product delivery device weld 55W, 56W. The product delivery device 55, 56 weld occurs between the product delivery device 55, 56 and the second annular sealing surface 32. The product delivery device weld 55W, 56W is radially spaced apart from the outer container weld 22W.

If desired, the valve 28 may be welded to the second sealing surface 32 directly or may be welded to the product delivery 55, 56. This assembly geometry provides the flexibility for various geometries depending upon the specific aerosol dispenser and product 42 combination desired.

The outer container 20C according to the present invention has two welds a product delivery device weld 55W, 56W and an outer container weld 22W, which are mutually radially spaced apart from the other. If one or more of the product delivery device weld 55W, 56W and outer container weld 22W are relatively thick in the radial dimension, and spaced relatively close to the other, the product delivery device weld 55W, 56W and outer container weld 22W may appear to merge. Such an embodiment is contemplated and within the scope of the present invention. While two radially spaced apart welds 55W, 56W, 22W are shown, one of skill will recognize that any plurality of welds may be utilized. Additional welds may be used to join additional components as desired or to reinforce the product delivery device weld 55W, 56W and outer container weld 22W.

The outer container weld 22W may circumscribe the product delivery device weld 55, 56W in concentric or eccentric fashion. The outer container weld 22W and product delivery device weld 55W, 56W may be of equal or unequal radial thickness, require equal or unequal energy to effect a proper bond and may be equally or unequally spaced from the other and equally or unequally spaced about the longitudinal axis.

As determined by the first annular sealing surface 31 circumscribing the second annular sealing surface 32, the outer container weld 22W will circumscribe the product delivery device weld 55W, 56W. The product delivery device weld 55W, 56W and outer container weld 22W may be in the same plane or in different planes. It is only important that the product delivery device weld 55W, 56W and outer container weld 22W, or other such respective seal between the product delivery device 55, 56/outer container 22 and valve 28 provide a pressure boundary to retain product 42 and propellant 40 within the outer container 22.

Without being bound by theory, it is believed that if a dip tube 56 is selected, only one of the product delivery device weld 56 and outer container weld 22 need circumscribe the longitudinal axis. The other of the product delivery device weld 56 and outer container weld 22 may comprise one or more discrete welds 22W, 56W which do not circumscribe the longitudinal axis, but merely hold these components in proper position. Of course, any type of seals such as press fit, interference fit, solvent welding, laser welding, sonic welding, ultrasonic welding, spin welding, adhesive and any combination thereof which maintains the pressure boundary may be used.

The valve 28 is preferably spin welded by rotation about the longitudinal axis. The valve 28 is subjected to relative motion against the outer container 22 and product delivery device 55, 56. The outer container 22 and product delivery device 55, 56 may be rotated about the longitudinal axis and the valve 28 held stationary. Or preferably the outer container 22 and product delivery device 55, 56 are held stationary and the valve 28 rotated relative thereto. Any difference in rotation between the valve 28 and the outer container 22/product delivery device 55, 56 which produces sufficient friction to create a leak tight weld for a pressure boundary for the propellant 40 and product 42 is suitable.

This arrangement advantageously allows for assembly of any desired product delivery device 55, 56 providing it is sealingly complementary to the second annular sealing surface 32. This arrangement then advantageously allows for subsequent assembly of any desired valve 28, providing it is sealingly complementary to the first annular sealing surface 31. Thus any combination and variety of bags 55, dip tubes 56 and valves 28 may be used with a single outer container 22. This arrangement advantageously minimizes production and storage of a variety of outer containers 22, in lieu of only a single outer container 22 being required for any particular size of aerosol dispenser 20.

Figure 8A:
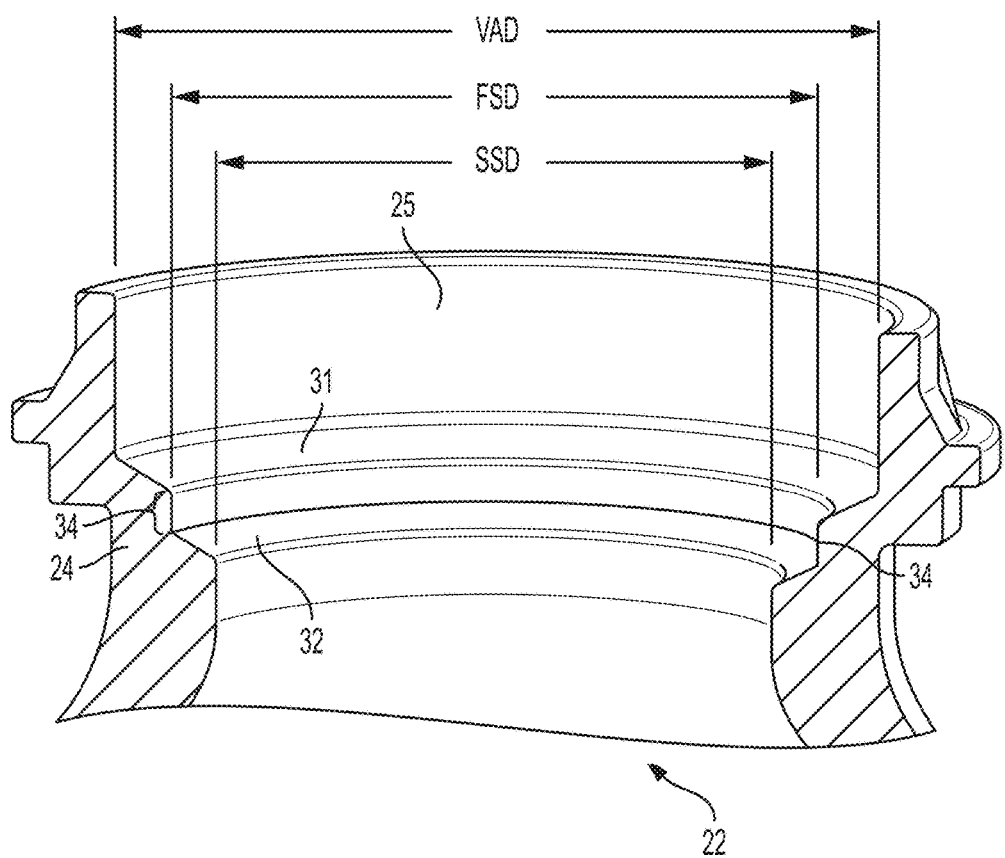
FIG. 8A is an enlarged fragmentary perspective view of an outer container having generally parallel first surface and second surface, both oblique to the longitudinal axis.
Figure 8B:
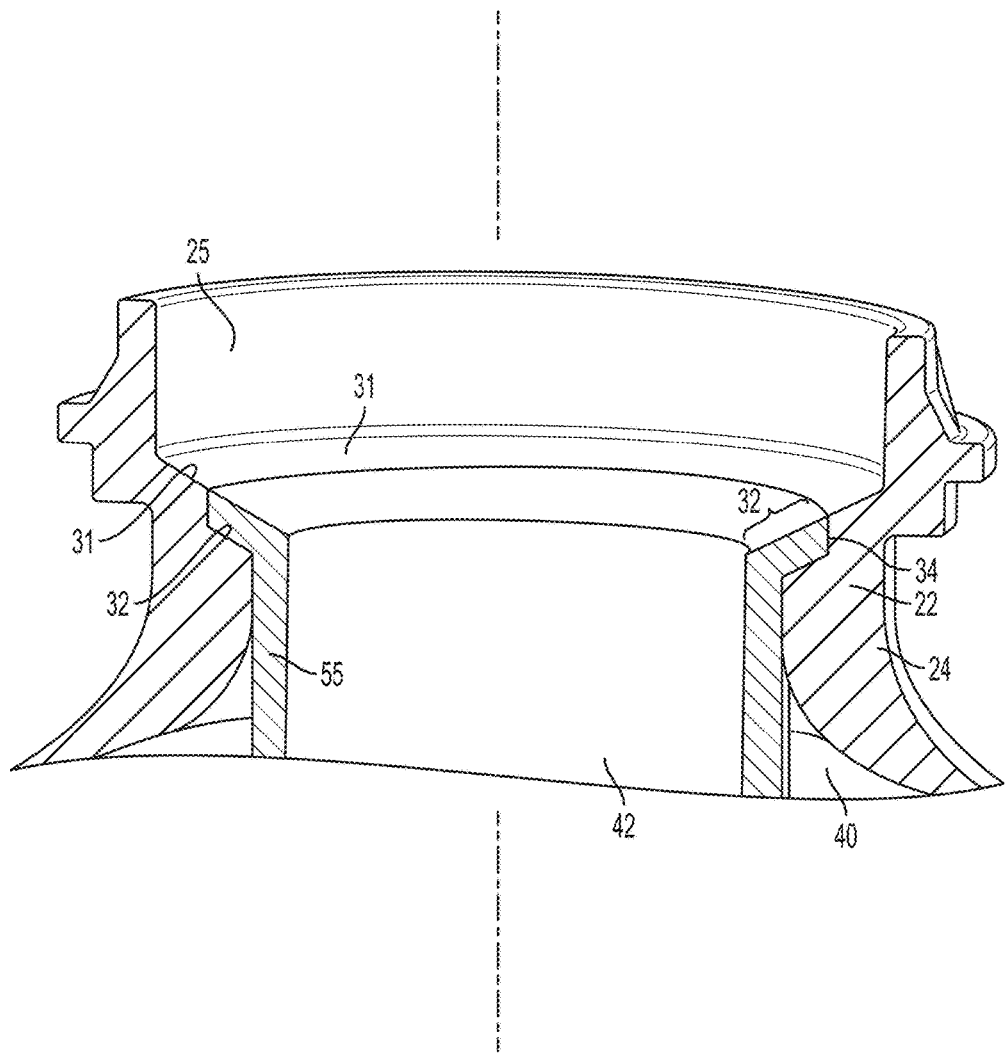
FIG. 8B is an enlarged fragmentary perspective view of the embodiment of FIG. 8A having a bag inserted therein for a product delivery device.
Figure 8C:
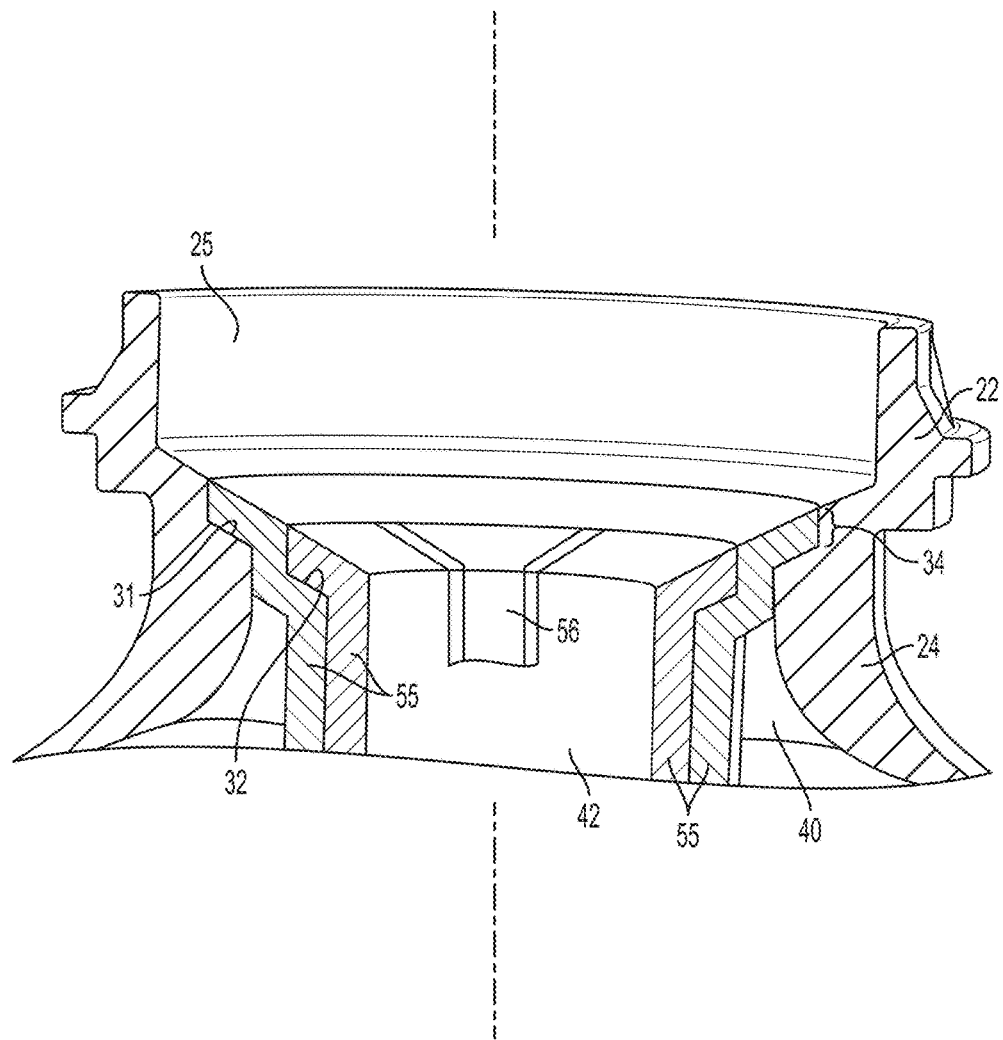
FIG. 8C is an enlarged fragmentary perspective view of the embodiment of FIG. 8A having two coaxial bags inserted therein for a single product delivery device and showing an optional dip tube in the single product delivery device.

Referring to FIGS. 8A, 8B and 8C, either or both of the first surface 31 and/or second surface 32 may be a sealing surface. By sealing surface it is meant that a valve 28 may be seated upon the first annular sealing surface 31 without leakage of propellant 40 therebetween to ambient. Likewise, by sealing surface it is meant that a product delivery device 55, 56 may be seated upon the second annular sealing surface 32 without leakage of propellant 40 therebetween to ambient. It is to be understood the first surface 31 may or may not be a first annular sealing surface 31 provided adequate seal is elsewhere provided. Likewise, the second surface 32 may or may not be a second annular sealing surface 32 provided adequate seal is elsewhere provided.

A component complementary to the second annular sealing surface 32 can be disposed thereon and not interfere, particularly in the longitudinal direction, with a valve 28 operable by a user when the valve 28 is attached. It is only necessary that the valve 28 fit to the first sealing surface in operable relationship. This arrangement provides the benefit that multiple valves 28 may be used with a single outer container 22, depending upon the particular product[s] 42 desired.

Likewise, multiple components may be disposed on the second annular sealing surface 32, so long as such second component remains below the valve 28. The second component may be a bag 55 or a dip tube 56.

The first annular sealing surface 31 may be concentric to the longitudinal axis and frustroconical, as shown. This arrangement provides the benefit that a valve 28 disposed thereon will seat to the lowest point, i.e. having the smallest diameter. The valve 28 is disposed in the proper position without a separate step required in the manufacturing process.

The second annular sealing surface 32 may be concentric and perpendicular to the longitudinal axis and annular, as shown. This arrangement provides the benefit that a component disposed thereon will seat concentric and below the first sealing surface 32. The product delivery device 55, 56 is disposed in the proper place without a separate step required in the manufacturing process. The product delivery device 55, 56, or other component, is installed and seated before the valve 28 is inserted.

If desired, the first annular sealing surface 31 and second annular sealing surface 32 may be contiguous. This arrangement provides the benefit that the first annular sealing surface 31 and second annular sealing surface 32 need not be separately assembled during manufacturing, simplifying production and reducing the opportunity for mistakes. More particularly, in one preferred embodiment the first annular sealing surface 31 and second annular sealing surface 32 may be mutually integral and integral with the outer container 22. This arrangement provides the benefit of ease of manufacture, by eliminating unnecessary assembly of multiple parts.

In each of the foregoing embodiments, the first annular sealing surface 31 and second annular sealing surface 32 are generally contiguous in the absence of seal 30. But the first annular sealing surface 31 and second annular sealing surface 32 may be longitudinally spaced apart without departure from the invention claimed herein. The first annular sealing surface 31 and second annular sealing surface 32 may be mutually skewed or mutually parallel in a degenerate case. If desired, threads 25 may also be used to assist in component assembly.

If desired, two or more product delivery devices 55, 56 may be used with the aerosol dispenser 20 of the present invention. Such plural product delivery devices 55, 56 may include one or more bags 55, one or more dip tubes 56 or any combinations thereof. The plural product delivery devices may be coaxial or parallel. This arrangement provides the benefit that plural products 42 may be co-dispensed, but not intermixed until the point of use.

Referring to FIGS. 8A, 8B and 8C, the foregoing aerosol dispensers 20, outer containers 22 and preforms 60, may have a transition 34 between the first annular sealing surface 31 and the second annular sealing surface 32. The transition 34 is any discernable break dividing the first annular sealing surface 31 and the second annular sealing surface 32. Of course there may be three or more sealing surfaces 31, 32, having respective transitions, 34, providing the sealing surfaces 31, 32 are appropriately sized. The transitions 34 provide the benefit that each of the first annular sealing surface 31 and second annular sealing surface 32 can be specifically tailored to its particular function of sealingly retaining the valve 28 and product delivery device 55, 56, respectively.

Referring to FIGS. 8A-8C, the transition 34 may comprise a step between the first annular sealing surface 31 and the second annular sealing surface 32. The step may be a longitudinal break, between a mutually parallel or mutually skewed first annular sealing surface 31 and second annular sealing surface 32.

Figure 9:
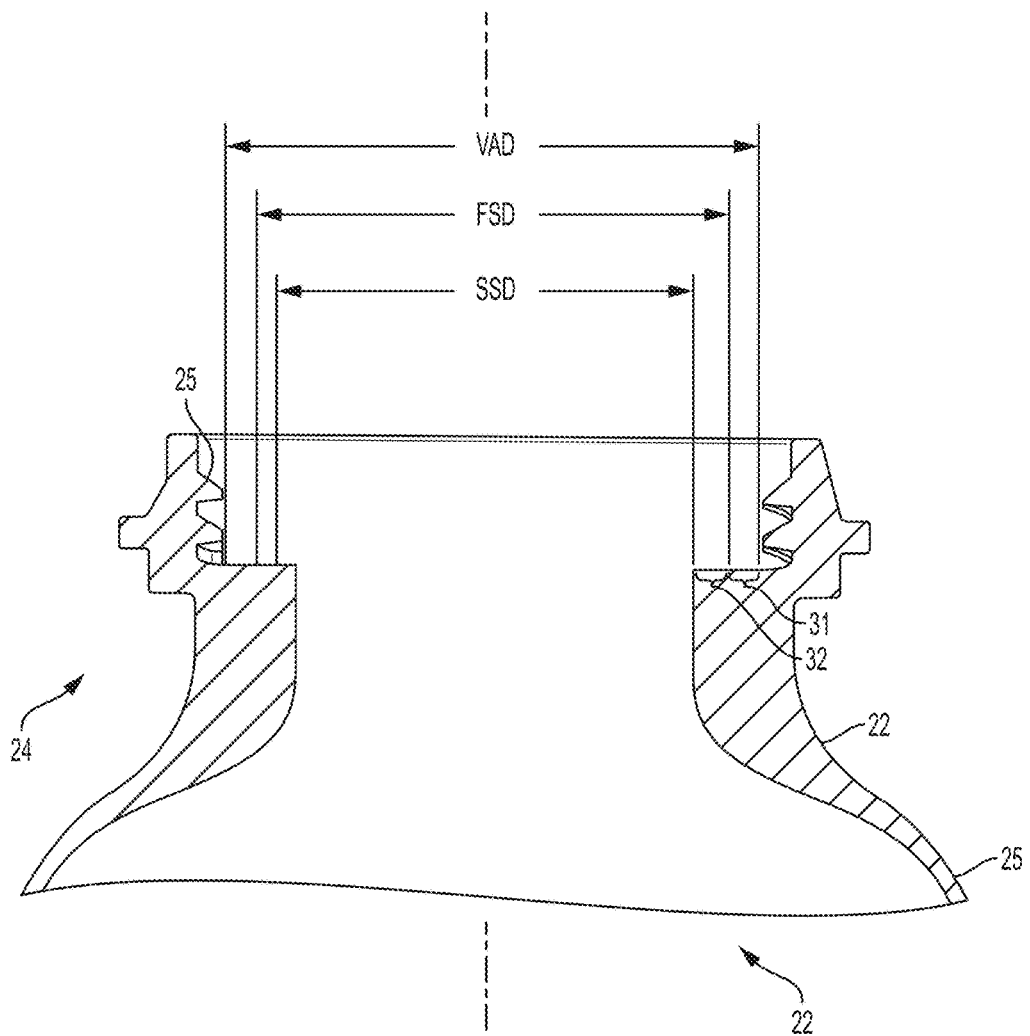
FIG. 9 is an enlarged, instantaneous fragmentary sectional view of an outer container having contiguous and coplanar first and second sealing surfaces generally perpendicular to the longitudinal axis and not having an optional seal therebetween.

Referring to FIG. 9, an aerosol dispenser 20 according to the present invention need not have a transition 34 between the first annular sealing surface 31 and the second annular sealing surface 32. It is the benefits of the present invention to provide a chassis for multiple combinations of valves 28 and product delivery devices 55, 56 using the first annular sealing surface 31 and the second annular sealing surface 32.

The first annular sealing surface 31 and second annular sealing surface 32 may each be disposed generally perpendicular to the longitudinal axis, provided the second annular sealing surface 32 still has a smaller diameter SSD than the diameter FSD of the first annular sealing surface 31. This arrangement provides the benefit that the peripheries of the first annular sealing surface 31 and second annular sealing surface 32 may prevent undue radial movement of the valve 28 and product delivery device 55, 56, respectively. It is to be understood that the embodiments of, for example, FIG. 9 has first annular sealing surface 31 and second annular sealing surface 32 in contiguous relationship and uninterrupted by an optional seal 30.

The first surface may have a diameter FSD of 7 to 23 mm and preferably 10 to 20 mm. The threads 25 may have a diameter VAD of 10 to 30 mm, and preferably 15 to 25 mm. A thread 25 diameter VAD of 18.3 mm and a first surface 30 diameter VAD of 13.6 mm have been found suitable. The first annular sealing surface 31 may be longitudinally disposed at least 1 mm, particularly 1 to 5 mm below the lowest thread 25. The second annular sealing surface 32 may have a diameter SSD less than the threads 25 or other valve attachment diameter VAD and greater than the first sealing surface 32 diameter FSD.

The absence of an optional transition 34, or a bead seal, provides the benefit of manufacturing flexibility, to accommodate valve 28 and product delivery device 55, 56 of different radial and longitudinal dimensions. While first annular sealing surface 31 and second annular sealing surface 32 are shown to be in specific and fixed in relationship, one of skill will recognize the invention is not so limited. Utilizing a preform 60/outer container 22/aerosol dispenser 20 according to these and like embodiments offers manufacturing flexibility not previously found in the art. These embodiments allow the manufacturer to select a number of suitable valves 28, so long as they fit onto the first annular sealing surface 31.

A first valve 28, suitable for a first product 42, may have a first annular footprint on first annular sealing surface 31. A second valve 28, suitable for a second product 42, may have a second, and different, annular footprint on first annular sealing surface 31, etc. The chassis provided by the preform 60/outer container 22/aerosol dispenser 20 provides this flexibility for multiple valves 28, provided that sufficient footprint is available on second annular sealing surface 32 to accommodate the product delivery device 55, 56.

Thus a product delivery device 55, 56, suitable for a first product 42, may have a first annular footprint on second annular sealing surface 32. A second product delivery device 55, 56, suitable for a second product 42, may have a second, and different, annular footprint on second annular sealing surface 32, etc. The chassis provided by the preform 60/outer container 22/aerosol dispenser 20 provides this flexibility for multiple The chassis provided by the preform 60/outer container 22/aerosol dispenser 20 provides this flexibility for multiple valves 28, provided that sufficient footprint is available on second annular sealing surface 32 to accommodate the product delivery devices 55, 56, provided that sufficient footprint is available on first annular sealing surface 31 to accommodate the valve 28.

If desired, the valve 28 may be stacked on and overlap bag 55/dip tube 56. This arrangement provides the benefit of a common seal annulus and increased flexibility in sizing the valve 28/bag 55/dip tube 56.

If desired, the valve 28 may be attached to an optional valve cup 26. Optionally the product delivery device 55, 56, particularly a bag 55 or dip tube 56, may be attached to, and more particularly integrally attached to, the valve cup 26. A suitable configuration is disclosed in commonly assigned P&G Case 14461, application Ser. No. 15/235,279, filed Aug. 12, 2016, particularly as disclosed in FIGS. 1C-1D thereof.

Figure 10:
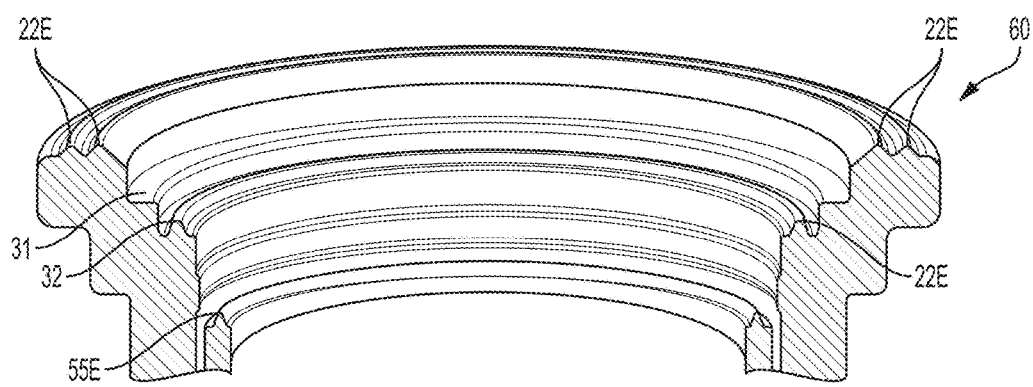
FIG. 10 is a schematic fragmentary sectional view of a neck of an outer container and bag, each having an upwardly projecting protrusion.

Referring to FIG. 10, alternatively, the product delivery device protrusion 55E, 56E may project upwardly from the product delivery device 55, 56. Likewise the outer container protrusion 22E may project upwardly from the outer container 22. One of skill will recognize that a combination of a product delivery device protrusion 55E, 56E and an outer container protrusion 22E with one projecting upward, the other downward is also feasible and within the scope of the invention.

Figure 11A:
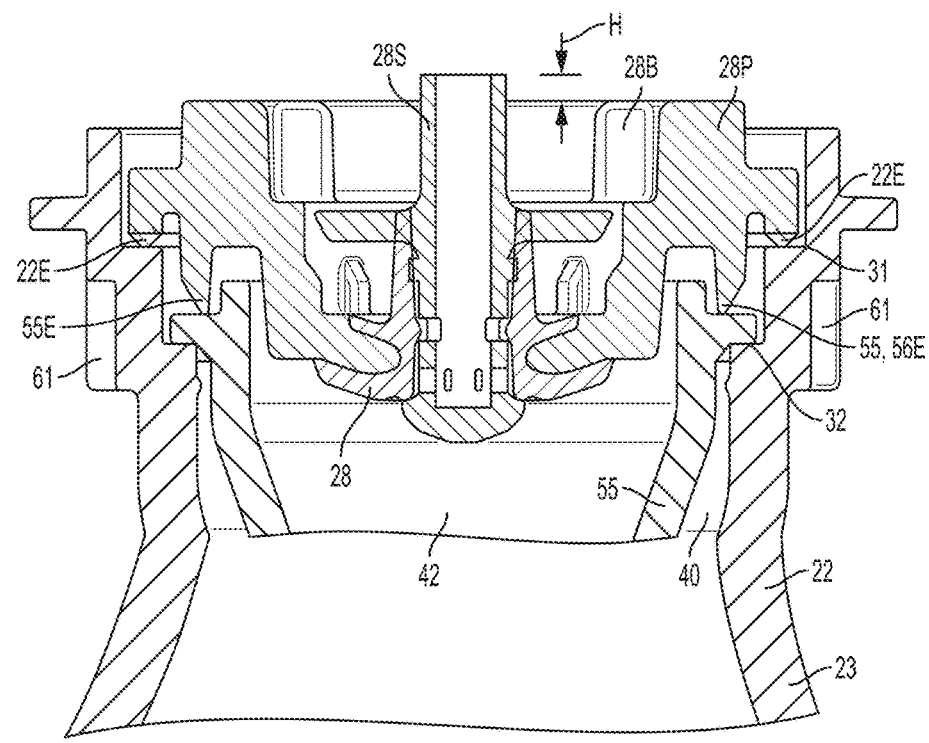
FIG. 11A is a vertical sectional view of an outer container, valve and bag in position for joining.
Figure 11B:
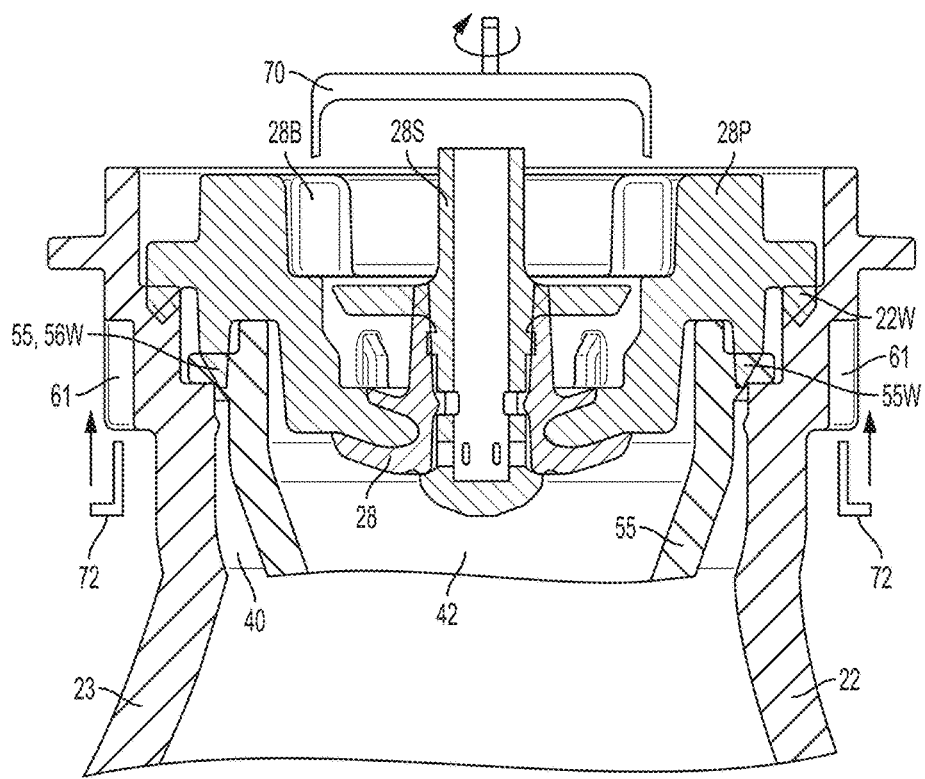
FIG. 11B is a vertical sectional view of the outer container, valve and bag of FIG. 11A after welding, and showing a schematic external drive and schematic chuck.

Referring to FIGS. 11A-11B, the preform 60 and outer container 22 formed therefrom may have divots 61 therein. The divots 61 are gripped by the welding equipment during the welding step, and minimize or prevent rotation of the outer container 22 during the welding step. Likewise, divots 61 may be incorporated between the outer container 22 and the product delivery device 55, 56 to prevent rotation therebetween. This arrangement allows for relative movement between the valve 28 and the outer container 22/the product delivery device 55, 56 if spin welding is the step selected to join these components.

Referring particularly to FIG. 11B, an external drive 70 may be used to provide relative motion between the valve 28 and the product delivery device 55, 56/outer container 22. The external drive 70 may be vertically actuated to engage blades 28B, then vertically retracted. Likewise chuck 72 may be vertically actuated to engage divots 61, which provide torque counter to the external drive 70. Upon welding, the valve 28 may axially move downward a distance H, corresponding to the melting of the protrusions 22E, 55E.

Figure 12:
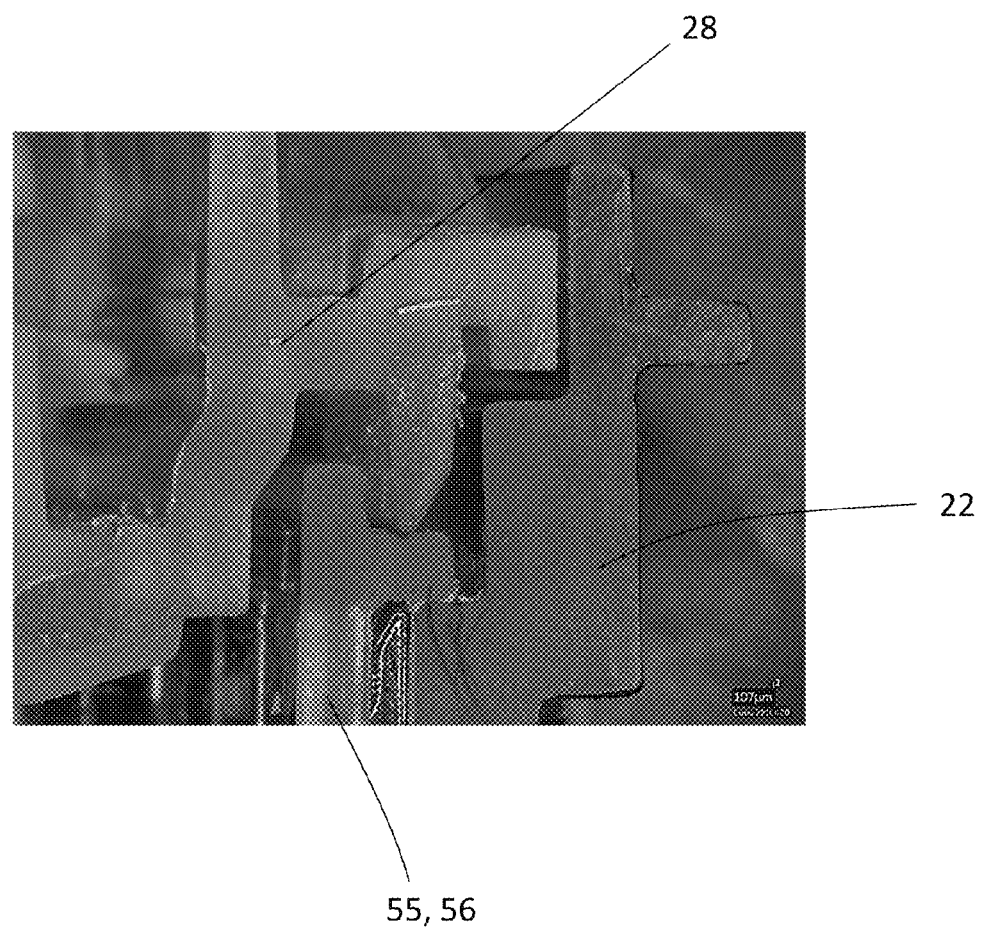
FIG. 12 is an image of a vertical section view of an outer container, valve, and product delivery device before welding.
Figure 13:
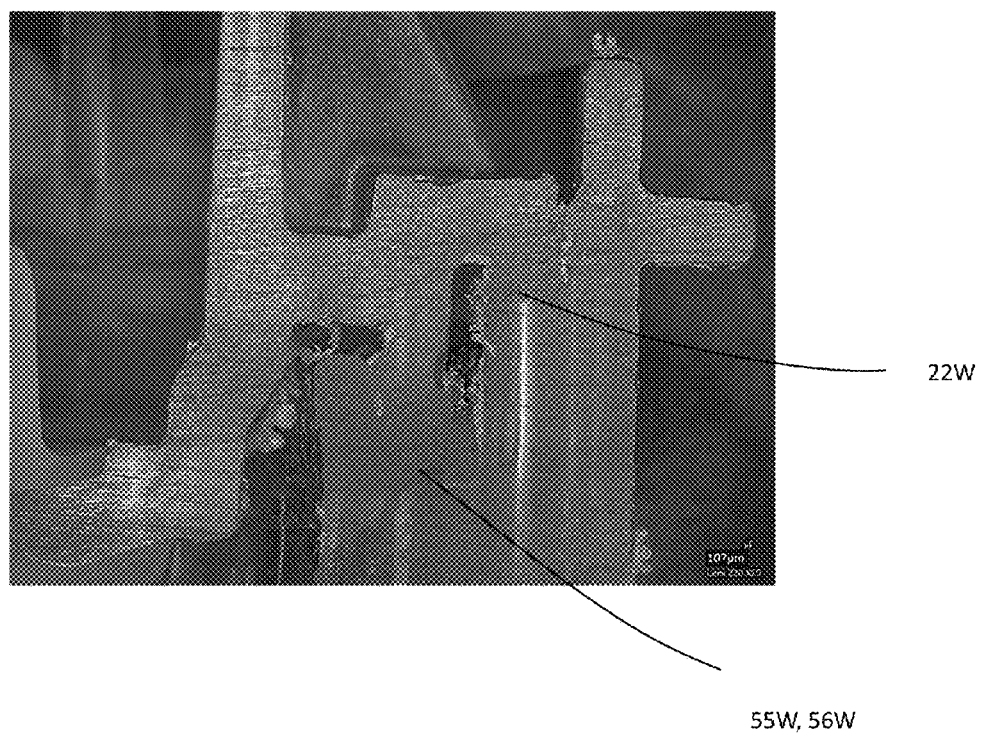
FIG. 13 is an image of a vertical section view of the outer container, valve, and product delivery device of FIG. 12 after spin-welding to a weld depth of 0.4 mm.
Figure 14:
FIG. 14 is an image of a vertical section view of the outer container, valve, and product delivery device of FIG. 12 after spin-welding to a weld depth of 1.0 mm.
Figure 15:
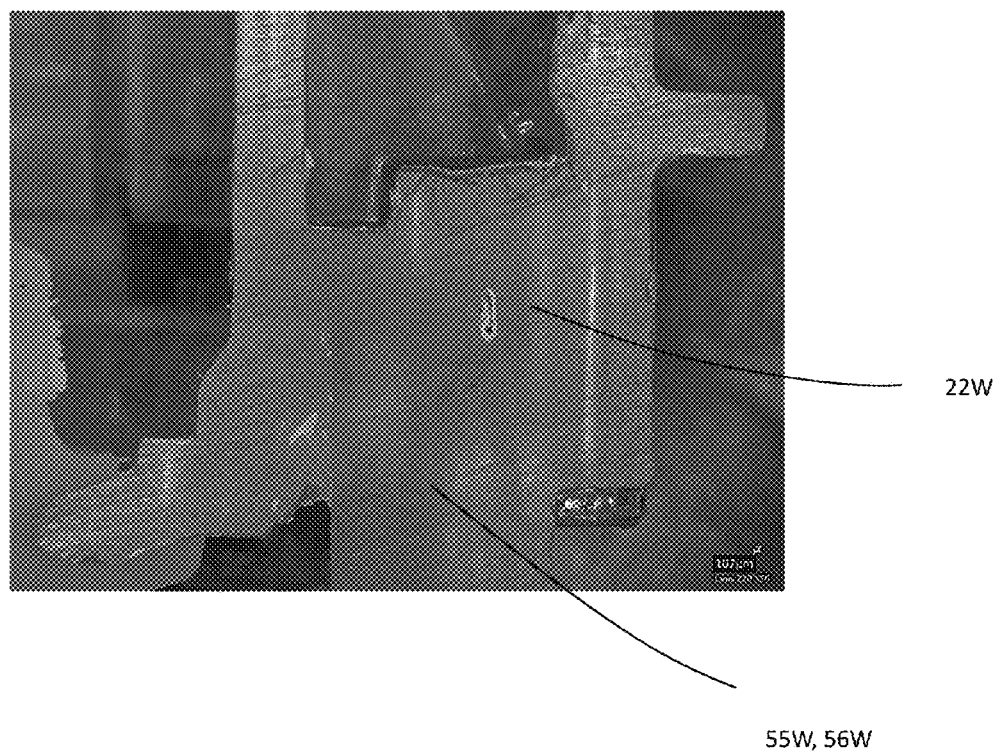
FIG. 15 is an image of a vertical section view of the outer container, valve, and product delivery device of FIG. 12 after spin-welding to a weld depth of 1.8 mm.

FIG. 12 shows an image of a vertical section view of an outer container 22, valve 28, and product delivery device 55, 56 before welding. With reference to FIGS. 13-15, after spin-welding, outer container weld 22W and product delivery device weld 55W, 56W may be formed. As shown in FIGS. 13-15, as the weld depth increases, the size of the outer container weld 22W and the product delivery device weld 55W, 56W increases and the greater portion of the outer container, valve, and product delivery device that are melted and welded together. Welding provides additional structural strength to retain the valve and reinforce the neck of the bottle. Moreover, as shown in FIGS. 13-15, welding causes the melted material to fill all or a portion of the gaps between the outer container 22, valve 28, and product delivery device 55, 56. The greater the weld depth, the more the gaps may be filled by melted material.

Referring back to FIGS. 3A-3B, the bag 55 may be integrally injection molded with the valve cup 26. If the preform 60 is to be stretched into a bag 55, the preform 60 may have a wall thickness of 1 to 3 mm. The resulting bag 55 is collapsible upon depletion of product 42 therefrom. The resulting bag 55 may have a thickness of 0.07 to 0.2 mm.

If desired, the outer container 22 and propellant 40 may be assembled at a first location. The product 42, decoration, etc. may be added at a second location, as described in commonly assigned 2012/0292338 and 2012/0291911.

Thus, the aerosol dispenser 20 may be made by providing nested preforms 60 comprising an outer preform 60 and inner preform 60 disposed therein. The inner preform 60 has a valve cup 26 at the open end thereof.

The preforms 60 are blowmolded together to form an outer container 22 and having an open end and an inner bag 55 depending therefrom towards the closed end of the outer container. Propellant 40 is charged between the bag 55 and outer container 22. The valve cup 26 is sealing joined to the open end of the outer container 22 to contain the propellant 40 therein and form an aerosol container 20C. The aerosol container 20C may then be stored as needed or directly shipped for product 42 fill, installing the valve 28, actuator 29, label 57, etc.

Alternatively, an integral inner bag 55/valve cup 26 combination may be provided and inserted into an outer container 22. The inner bag 55 is inserted in the open end of the outer container 22. Propellant 40 is charged between the bag 55 and outer container 22. The integral valve cup 26 is sealingly joined to the open end of the outer container 22 to contain the propellant 40 therein and form an aerosol container 20C. The aerosol container 20C may then be stored as needed or directly shipped for product 42 fill, installing the valve 28, actuator 29, label 57, etc. In either alternative, the inner preform 60 may have a neck 24 according to the present invention, with the first annular sealing surface 31 and second annular sealing surface 32 as described and claimed herein.

Each embodiment described above has an aerosol container having a longitudinal axis and comprising an outer container comprising a closed end bottom and an open neck longitudinally opposed thereto. While the preferred invention has been described in terms of a product delivery device weld 55W, 56W and an outer container weld 22W, the invention is not so limited. The open neck 24 may have a valve 28 sealed to the outer container 22 in fluid tight relationship by any suitable outer container seal 22W. Likewise, the product delivery device 55, 56 may be sealed to the valve 28 in fluid tight relationship by any suitable product delivery device seal 55, 56W. The product delivery device seal 55, 56W is radially spaced apart from, and preferably inward of, the outer container seal 22W.

Suitable outer container seals 22W and suitable product delivery device seals 55, 56W include a press fit, interference fit, adhesive, solvent welding, laser welding, sonic welding, ultrasonic welding, preferably spin welding, or any combination thereof. An intermediate component, such as a sleeve or connector may optionally be disposed intermediate to form the outer container seals 22W and suitable product delivery device seals 55, 56W Any such arrangement is suitable, so long as a permanent seal adequate to maintain the pressure results.

Generally polymeric components are preferred, for the outer container 22, valve 28 and product delivery device 55, 56. PET has been found to be particularly preferred. PET is suitable for preferred sealing as described below.

Of the various sealing processes described above, welding has been found to be preferred, and spin welding has been found to be particularly preferred. Spin welding provides the unpredicted benefit of concentrating the energy input near the outer container seal 22W and product delivery device seal 55, 56W, thereby minimizing wasted energy, and minimizing extraneous energy directed downward where damage to the product delivery device 55, 56 may result. Spin welding further provides the unpredicted benefit of forming the outer container seal 22W and product delivery device seal 55, 56W in a single operation.

While the outer container seals 22W and product delivery device seals 55, 56W are shown to be mutually concentric and concentric to the longitudinal axis, the invention is not so limited. The outer container seal 22W and product delivery device seal 55, 56W may be of constant or variable thickness in the radial direction, in the same plane or mutually different planes with either being above or below the other, may be formed by the same process or different processes, may be perpendicular to or skewed to the longitudinal axis, mutually eccentric and/or eccentric to the longitudinal axis, and be within the scope of the appended claims.

While a round outer container 22 is described, the invention is not so limited. The outer container 22, and thus the valve attachment, first annular sealing surface 31 and second annular sealing surface 32 may be of any desired shape so long as the circumference of the second annular sealing surface 32 is less than and interior to the circumference of the first annular sealing surface 31 which in turn is less than and interior to the circumference of the valve attachment circumference. Preferably the valve attachment circumference, first annular sealing surface 31 circumference and second annular sealing surface 32 circumference are concentric.

In one embodiment, one of skill will recognize that a single outer container 22 may be used with $n_1$ different valves, properly sized to the valve attachment diameter VAD, with $n_2$ bags 55 and with $n_3$ dip tubes 56. This embodiment provides multiple formats, and $n_1 \times n_2 \times n_3$ different combinations of formats which may be advantageously used with a single outer container 22. Thus a single outer container 22 provides a chassis for $n_1 \times n_2 \times n_3$ different aerosol dispensers 20. Manufacturing complexity is reduced and flexibility increased using the present invention.

Thus a suitable embodiment is to use a single outer container 22 with any number of desired valves 28. Regarding the valve 28, it is only necessary that each valve 28 fit into the first annular sealing surface 31 and functionally dispense the product 42. Likewise regarding the product delivery device 55, 56, it is simply necessary that each product delivery device 55, 56 fit into the second annular sealing surface 32 and functionally dispense the product 42.

Thus a bag 55 need only have a collar 55C and a dip tube 56 need only have a dip tube collar 56C which sealingly fits onto the second annular sealing surface 32. Of course, the product delivery device 55, 56 and valve 28 should not interfere with each other during assembly and use.

The invention comprises various embodiments and combinations, as set forth below in exemplary, non-limiting manner It is to be understood that any of the variations, and combinations listed in each of the embodiments for the outer container 22, aerosol container 20C aerosol dispenser 20 and/or preform 60 may be used for any other such embodiment without limitation.

A. An aerosol container 20C having a longitudinal axis and comprising:
A polymeric outer container 22 comprising a closed end bottom and an open neck 24 longitudinally opposed thereto,
said open neck 24 having a valve 28 sealed to said outer container 22 in fluid tight relationship by an outer container seal 22W,
a product 42 delivery device 55, 56 sealed to said valve 28 in fluid tight relationship by a product 42 delivery device seal 55, 56W,
said product 42 delivery device seal 55, 56W being radially spaced apart from said outer container seal 22W.

B. An aerosol container 20C according to paragraph A wherein said product 42 delivery device seal 55, 56W is spaced radially inward of said outer container seal 22W.

C. An aerosol container 20C according to paragraphs A and B wherein said product 42 delivery device seal 55, 56W is spaced below and radially inward of said outer container seal 22W.

D. An aerosol container 20C according to paragraphs A, B and C wherein at least one of said product 42 delivery device seal 55, 56W and said outer container seal 22W is a spin weld.

E. An aerosol container 20C according to paragraphs A, B, C and D wherein said product 42 delivery device seal 55, 56W is a spin weld and said outer container seal 22W is a spin weld.

F. An aerosol container 20C according to paragraphs A, B, C, D and E wherein said product 42 delivery device 55, 56 comprises a bag 55, said bag 55 being joined to said outer container 22 by said spin weld, and further comprising propellant between said bag 55 and said outer container 22, product 42 42 within said bag 55 and an actuator 29 operably connected to said valve 28 for selectively dispensing said product 42 42 from said aerosol dispenser 20 upon demand.

G. An aerosol container 20C having a longitudinal axis and comprising:
A polymeric outer container 22 comprising a closed end bottom and an open neck 24 longitudinally opposed thereto,
said open neck 24 having a valve cup 26 spin welded to said outer container 22 in fluid tight relationship by an outer container weld 22W,
a valve 28 disposed within said valve cup 26,
a product 42 delivery device 55, 56 spin welded to said valve 28 in fluid tight relationship by a product 42 delivery device weld 55, 56W,
said product 42 delivery device 55, 56 weld being radially spaced apart from said outer container weld 22W, and propellant disposed within said outer container 22.

H. An aerosol container 20C according to paragraph G wherein said outer container weld 22W is disposed radially outward of said product 42 delivery device weld 55, 56W.

I. An aerosol container 20C according to paragraphs G and H wherein said outer container weld 22W is disposed radially outward of and above said product 42 delivery device weld 55, 56W.

J. An aerosol container 20C according to paragraphs G, H and I wherein said outer container weld 22W is disposed radially outward of and contiguous with said product 42 delivery device weld 55, 56W.

K. An aerosol container 20C according to paragraphs G, H, I and J wherein said outer container weld 22W has a respective outer container weld 22W thickness in the radial direction and said product 42 delivery device weld 55, 56W has a respective product 42 delivery device 55, 56 weld thickness in the radial direction, said product 42 delivery device weld 55, 56W thickness being substantially the same radial thickness dimension as said outer container weld 22W thickness.

L. An aerosol container 20C according to paragraphs G, H, I, J and K wherein said outer container weld 22W and said product 42 delivery device weld 55, 56W are mutually concentric.

M. An aerosol container 20C according to paragraphs G, H, I, J, K and L wherein said outer container weld 22W is and said product 42 delivery device weld 55, 56W are mutually concentric, and longitudinally spaced apart in different planes.

N. An aerosol container 20C according to paragraphs G, H, I, J, K, L and M wherein said product 42 delivery device 55, 56 comprises a dip tube 56.

O. An aerosol container 20C according to paragraphs G, H, I, J, K, L, M and N further comprising product 42 42 within said propellant and dispensable through said dip tube 56, and an actuator 29 operably connected to said valve 28 for selectively dispensing said product 42 42 from said aerosol dispenser 20 upon demand to be a functional aerosol dispenser 20.

P. An aerosol container 20C having a longitudinal axis and comprising:
a polymeric outer container 22 comprising a closed end bottom and an open neck 24 longitudinally opposed thereto,
said open neck 24 having a valve 28 spin welded to said outer container 22 in fluid tight relationship by a respective valve spin weld 28W, and
a product 42 delivery device 55, 56 spin welded to said valve 28 in fluid tight relationship by a product 42 delivery device weld 55, 56W,
said product 42 delivery device weld 55, 56W being radially spaced apart from said outer container weld 22W.

Q. An aerosol container 20C according to paragraph P wherein said neck 24 of said outer container 22 has an inner periphery, said inner periphery being stepped to have at least a first annular sealing surface 31, said valve 28 being joined to said outer container 22 at said first annular sealing surface 31.

R. An aerosol container 20C according to paragraphs P and Q wherein said neck 24 of said outer container 22 has an inner periphery, said inner periphery being stepped to have at a first annular sealing surface 31 and a second annular sealing surface 32, said valve 28 being welded to said first annular sealing surface 31 and said product 42 delivery device 55, 56 being welded to said second annular sealing surface 32.

S. An aerosol container 20C according to paragraphs P, Q, and R wherein said neck 24 of said outer container 22 has an inner periphery, said inner periphery being stepped to have at a first annular sealing surface 31 and a second annular sealing surface 32, said first annular sealing surface 31 and said second annular sealing surface 32 being perpendicular to said longitudinal axis, said valve 28 being welded to said first annular sealing surface 31 and said product 42 delivery device 55, 56 being welded to said second annular sealing surface 32.

T. An aerosol container 20C according to paragraphs P, Q, R and S further comprising product 42 in said outer container 22, and an actuator 29 operably connected to said valve 28 for selectively dispensing said product 42 from said aerosol dispenser 20 upon demand to be a functional aerosol dispenser 20, said aerosol dispenser 20 consisting essentially of polymeric materials.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obviousto those skilled in the art that various other changes and modifications can be made without departing from the spirit and scope of the invention. It is therefore intended to cover in the appended claims all such changes and modifications that are within the scope of this invention.

What is claimed is:

1. An aerosol container having a longitudinal axis and comprising:
    a polymeric outer container comprising a closed end bottom and an open neck longitudinally opposed thereto,
    said open neck having a valve sealed to said outer container in fluid tight relationship by an outer container seal,
    a device for product delivery sealed to said valve in fluid tight relationship by a product delivery device seal,
    wherein said product delivery device seal is a spin weld and said outer container seal is a spin weld,
    wherein said product delivery device comprises a bag, and wherein said product delivery device seal is radially spaced apart from said outer container seal
    a propellant between said bag and said outer container, wherein product is disposed within said bag; and
    an actuator operably connected to said valve for selectively dispensing said product from said aerosol dispenser.

2. The aerosol container of claim 1 wherein said product delivery device seal is spaced radially inward of said outer container seal.

3. The aerosol container of claim 1 wherein said product delivery device seal is spaced below and radially inward of said outer container seal.

4. The aerosol container of claim 1 wherein at least one of said product delivery device seal and said outer container seal is a spin weld.

5. An aerosol container having a longitudinal axis and comprising:
    a polymeric outer container comprising a closed end bottom and an open neck longitudinally opposed thereto,
    said open neck having a valve cup spin welded to said outer container in fluid tight relationship by an outer container weld,
    a valve disposed within said valve cup,
    a device for product delivery spin welded to said valve in fluid tight relationship by a product delivery device weld,
    said product delivery device weld being radically spaced apart from said outer container weld, wherein said outer container weld is disposed radially outward of and contiguous with said product delivery device weld, and
    propellant disposed within said outer container.

6. The aerosol container of claim 5 wherein said outer container weld has a respective outer container weld thickness in the radial direction and said product delivery device weld has a respective product delivery device weld thickness in the radial direction, said product delivery device weld thickness being substantially the same radial thickness dimension as said outer container weld thickness.

7. The aerosol container of claim 5 wherein said outer container weld and said product delivery device weld are mutually concentric.

8. The aerosol container of claim 5 wherein said device weld is and said product delivery device weld are mutually concentric, and longitudinally spaced apart in different planes.

9. The aerosol container of claim 5 wherein said device for product delivery comprises a dip tube.

10. The aerosol container of claim 9 comprising product dispensable through said dip tube, and an actuator operably connected to said valve for selectively dispensing said product from said aerosol dispenser.

11. An aerosol container having a longitudinal axis and comprising:
    a polymeric outer container comprising a closed end bottom and an open neck longitudinally opposed thereto,
    said open neck having a valve spin welded to said outer container in fluid tight relationship by a valve spin weld, and
    a device for product delivery spin welded to said valve in fluid tight relationship by a product delivery device spin weld,
    said product delivery device spin weld being radially spaced apart from said valve spin weld, and
    wherein said neck of said outer container has an inner periphery, said inner periphery being stepped to have at least a first annular sealing surface, said valve being joined to said outer container at said first annular sealing surface.

12. The aerosol container of claim 11 wherein said inner periphery being stepped to have a second annular sealing surface, said valve being welded to said first annular sealing surface and said device for being welded to said second annular sealing surface.

13. The aerosol container of claim 11 wherein said inner periphery being stepped to have a second annular sealing surface, said first annular sealing surface and said second annular sealing surface being perpendicular to said longitudinal axis, said valve being welded to said first annular sealing surface and said device for product delivery being welded to said second annular sealing surface.

14. The aerosol container of claim 11 comprising product in said outer container, and an actuator operably connected to said valve for selectively dispensing said product from said aerosol dispenser upon demand to be a functional aerosol dispenser, said aerosol dispenser consisting essentially of polymeric materials.

* * * * *